United States Patent [19]

Motte

[11] 4,034,600

[45] July 12, 1977

[54] METHOD AND DEVICE FOR CHECKING CIGARETTES AND THE LIKE

[75] Inventor: Roger Motte, Fresnes, France

[73] Assignee: Arenco-Decoufle, Paris, France

[21] Appl. No.: 743,396

[22] Filed: Nov. 19, 1976

[30] Foreign Application Priority Data

Nov. 27, 1975 France ............................ 75.36338

[51] Int. Cl.² .......................................... G01M 3/26

[52] U.S. Cl. .................................................. 73/41

[58] Field of Search ........... 73/38, 40, 41, 45, 45.1, 73/45.2

[56] References Cited

U.S. PATENT DOCUMENTS 3,618,365 11/1971 McArthur .......................... 73/45.1

FOREIGN PATENT DOCUMENTS 186,380 11/1963 Sweden ................................ 73/45

*Primary Examiner*—S. Clement Swisher

[57] ABSTRACT

A method and a device are provided for checking finished cigarettes or other similar products in order to detect and reject detective cigarettes. The method consists essentially in filling a chamber with compressed gas in order to establish therein a pressure higher than a minimum pressure corresponding to an acceptable cigarette, cutting off the communication between said chamber and the source of compressed gas, connecting said chamber with one end of the cigarette while its other end is momentarily sealed, measuring the pressure drop resulting from the coupling of said chamber with the cigarette, and generating a rejection signal when the instantaneous value of the measured pressure drops below said minimum pressure valve. This invention is applicable notably to filter-tip cigarettes.

9 Claims, 10 Drawing Figures

METHOD AND DEVICE FOR CHECKING CIGARETTES AND THE LIKE

BACKGROUND OF THE INVENTION

1. Field of the Invention

The present invention relates to a method of and a device for checking finished cigarettes or other similar products, notably filter-tip cigarettes, in order to detect and discard defective cigarettes.

The term "defective cigarettes" means cigarettes of which the envelope is leaking for example on account of a faulty joint, a not properly fitted sleeve, a tear, a not properly glued seam, etc., or alternatively cigarettes insufficiently filled with tobacco, such as cigarettes having an empty end portion or pocket.

Considering the very high operating speeds of modern cigarette making machines, this checking operation cannot be performmed manually and therefore some automatic means must be provided for checking the cigarettes separately along the continuous stream of cigarettes produced by the machine, so as to discard faulty cigarettes and allow only sound cigarettes to proceed along the production circuit.

2. Description of the Prior Art

Many methods and devices have already been proposed for performing this checking operation automatically, notably by blowing air at predetermined pressure flow rate values through the cigarette, and measuring the pressure of flow rate of the air escaping from the opposite end of the cigarette, or alternatively by sucking or compressing air from or into a chamber surrounding the cigarette and measuring the pressure existing within the cigarette.

Among the various known methods devised for checking cigarettes, one method consists in transferring continuously across their longitudinal axes a series of regularly spaced cigarettes, causing said cigarettes to pass through a checking station, introducing gas from a suitable source of compressed gas into each cigarette passing through said control station, the compressed gas being delivered into a chamber communicating with one end of the cigarette while the opposite end thereof is momentarily sealed, measuring the pressure of the gas thus introduced into the cigarette, delivering a signal corresponding to the measured pressure, comparing said signal with a predetermined threshold value representative of a minimum pressure corresponding to an acceptable cigarette, and generating a rejection signal when the instantaneous value of the measured pressure is lower than said minimum pressure. In known devices for carrying out this prior art method, said chamber is supplied permanently with gaseous fluid, notably compressed air, and communicates with the external atmosphere during the time periods in which it is not connected to the end of a cigarette. When said chamber is connected to the cigarette end, the communication between said chamber and the atmosphere is discontinued or cut off, so that the pressure rises in the chamber. Theoretically, if the cigarette is not defective, the pressure in the chamber rises above the aforementioned minimum pressure and no rejection signal is generated.

However, in actual practice it appeared that in many cases these known checking devices eject a number of cigarettes without the certainty that the ejected cigarettes are really defective, or that all the defective cigarettes are effectively rejected. Although the reasons of this misfunctioning are not completely obvious, one may think that one reason is that the leakage flow of the gaseous fluid through the defective cigarette is in most instances extremely low. Since the chamber is supplied permanently with gaseous fluid, this continuous supply appears to compensate one fraction, if not the whole, of the leakage flow through the defective cigarette, so that the fluid pressure in said chamber may rise to a value higher than the above-mentioned minimum pressure, and thus the defective cigarette is not rejected. This obviously impairs the sensitivity and therefore the reliability of the cigarette checking device.

Moreover, in hitherto known cigarette checking devices of the above-mentioned type the pressure measured in the chamber is converted into an electric signal of which the value varies with the pressure and is compared with said predetermined threshold value corresponding to the aforesaid minimum pressure. The comparator provided for this purpose delivers an output signal only when the measured pressure exceeds said minimum pressure. The output signal of said comparator will thus indicate that the cigarette being checked is not defective, and therefore said signal cannot be utilized directly for controlling the means for rejecting or ejecting the faulty cigarettes. Consequently, the device must comprise on the one hand a synchronization device capable of generating a series of pulses, by reason of one pulse per cigarette, and on the other hand a logic circuit to which the output signal of said comparator and said series of pulses are fed for delivering at the output of said logic circuit a rejection signal when, within a predetermined time period, not output signal frm said comparator is delivered to said logic circuit. Therefore, the faulty cigarette rejection control logic circuit is relatively complicated insofar as it requires a preliminary treatment of the comparator output signal.

SUMMARY OF THE INVENTION

It is the essential object of the present invention to avoid the above-mentioned inconveniences characterizing hitherto known checking devices by providing an improved method of checking finished cigarettes or other similar products.

To this end, the invention provides a method of checking finished cigarettes or other similar products, notably filtertip cigarettes, in order to detect and reject defective cigarettes, comprising the steps of conveying continuously a series of cigarettes disposed at regularly spaced intervals in a direction at right angles to their longitudinal axes, causing said cigarettes to move successively past a checking station, feeding a compressed gas from a source of compressed gas successively into each cigarette as it moves past said checking station, said compressed gas being introduced into a chamber communicating with one end of the cigarette moving past said checking station while its opposite end is momentarily sealed, measuring the pressure of the gas thus fed into said cigarette, generating a signal representative of the measured pressure, comparing said signal with a predetermined threshold value representative of a minimum pressure corresponding to an acceptable cigarette, and generating a rejection signal when the instantaneous value of the measured pressure is lower than said minimum pressure, characterized in that said compressed gas feeding step comprises the steps of firstly filling said chamber with said compressed gas so as to obtain therein a pressure higher than said minimum pressure corresponding to an acceptable cigarette, cutting off a communication between said chamber and the source of compressed gas, and causing said chamber to communicate with said one end of the cigarette being checked, in that said measuring step consist in measuring a pressure drop resulting from the communication thus established between said chamber and the cigarette, and in that said rejection signal generating step consist in generating said said rejection signal when the instantaneous value of the measured pressure drops below said minimum pressure.

The invention also provides a device for checking cigarettes or other similar products, notably filter-tip cigarettes, in order to detect and reject defective cigarettes, comprising a conveyor for transferring continuously a series of regularly spaced cigarettes transversally to their longitudinal axes along a predetermined path, and a checking station disposed adjacent the path of said cigarettes and comprising a fixed measuring head incorporating a fixed chamber having an inlet and an outlet, and a transducer fitted in said fixed chamber, a source of compressed gas connected to the inlet of said fixed chamber, a compressed gas distributor for sequentially connecting the outlet of said chamber with one end of a cigarette when the latter moves past said checking station, means for sealing the opposite end of said cigarette at said checking station, a reference signal generator, and a comparator having inputs electrically connected to said generator and said transducer, respectively, characterized by further comprising a second compressed-gas distributor disposed between said compressed gas source and the input of said fixed chamber and arranged for supplying compressed gas to said fixed chamber sequentially at time intervals differing from the time periods during which the output of said fixed chamber communicates with the end of a cigarette moving past said checking station.

With this arrangement, an extremely short path may be obtained between the measuring chamber and the cigarette, which is of primary importance for the rapidity of the measurement, especially with modern cigarette making machines operating at very high speeds and delivering finished cigarettes at a rate of 4,000 cigarettes per minute or more. Moreover, the method and means according to the present invention increase considerably the sensitivity of the checking operation, for the mere fact of supplying fistly compressed air to a chamber without allowing this chamber to communicate with the cigarette, and then causing said chamber to communicate with the cigarette for the necessary measurement, makes it possible to detect even the smallest hole or the faintest leak in the cigarette. In contrast thereto, with the continuous supply systems known heretofore, small holes or weak leaks do not cause a pressure loss of a magnitude sufficient for permitting its proper detection. Moreover, with this invention it is possible to construct a cigarette checking device that can be associated with any type of cylindrical conveyor transferring cigarettes across their longitudinal axes. With this invention, it is also possible to check the cigarettes and to eject the faulty cigarettes on the same cylindrical conveyor, a procedure that cannot be adhered to as a rule, with hitherto known checking devices. Finally, since the checking device of this invention can be constructed in a particularly compact size, it is possible to carry out several checking steps on a same cylindrical conveyor by associating a plurality of checking device therewith.

BRIEF DESCRIPTION OF THE DRAWINGS

A detailed description of the present invention will now be made with reference to the attached drawings, in which.

DESCRIPTION OF THE PREFERRED EMBODIMENTS

Figure 1:
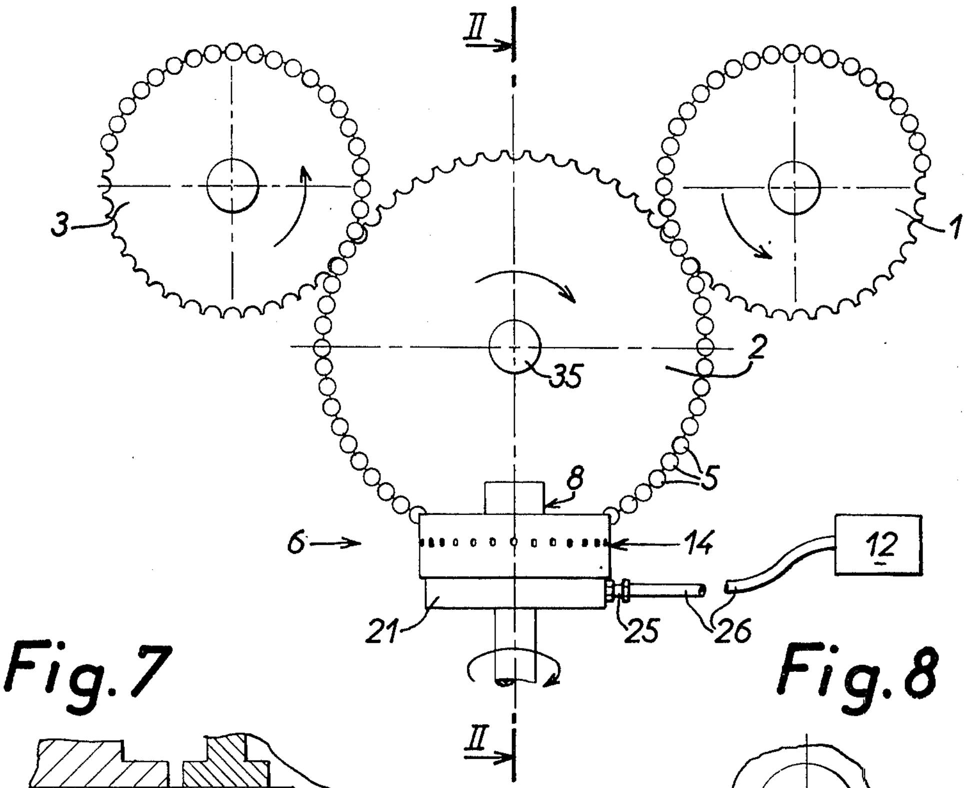
FIG. 1 is an elevational view of a checking device according to a first embodiment of this invention, said device being associated with a cylindrical conveyor of a cigarette making machine.

Referring firstly to FIG. 1 of the drawings, the assembly illustrated comprises three suction-type cylindrical conveyor 1, 2 and 3 of a cigarette making machine. These conveyors are adapted to transfer continuously, at a relatively high rate and in a direction perpendicular to their longitudinal axes, a continuous series of cigarettes 5. A cigarette checking device 6 is associated with the intermediate cylindrical conveyor 2.

The suction-type cylindrical conveyors 1, 2 and 3 are of a type well known per se and therefore their detailed description is not deemed necessary herein.

The intermediate cylindrical conveyor 2 is adapted to move the cigarettes 5 past a check point 7 of checking device 6.

Figure 2:
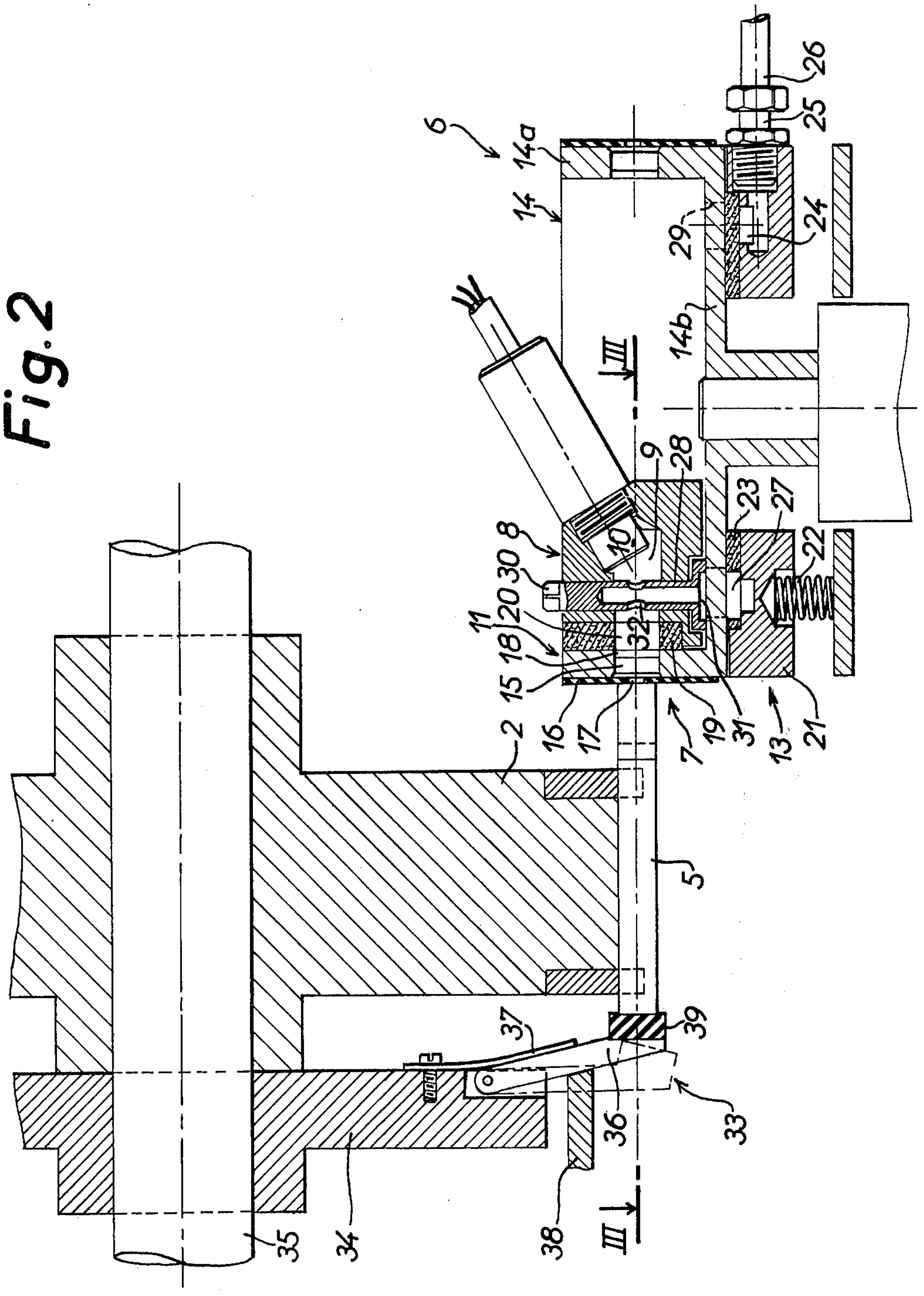
FIG. 2 is a fragmentary section taken on a larger scale along the line II—II of FIG. 1.
Figure 3:
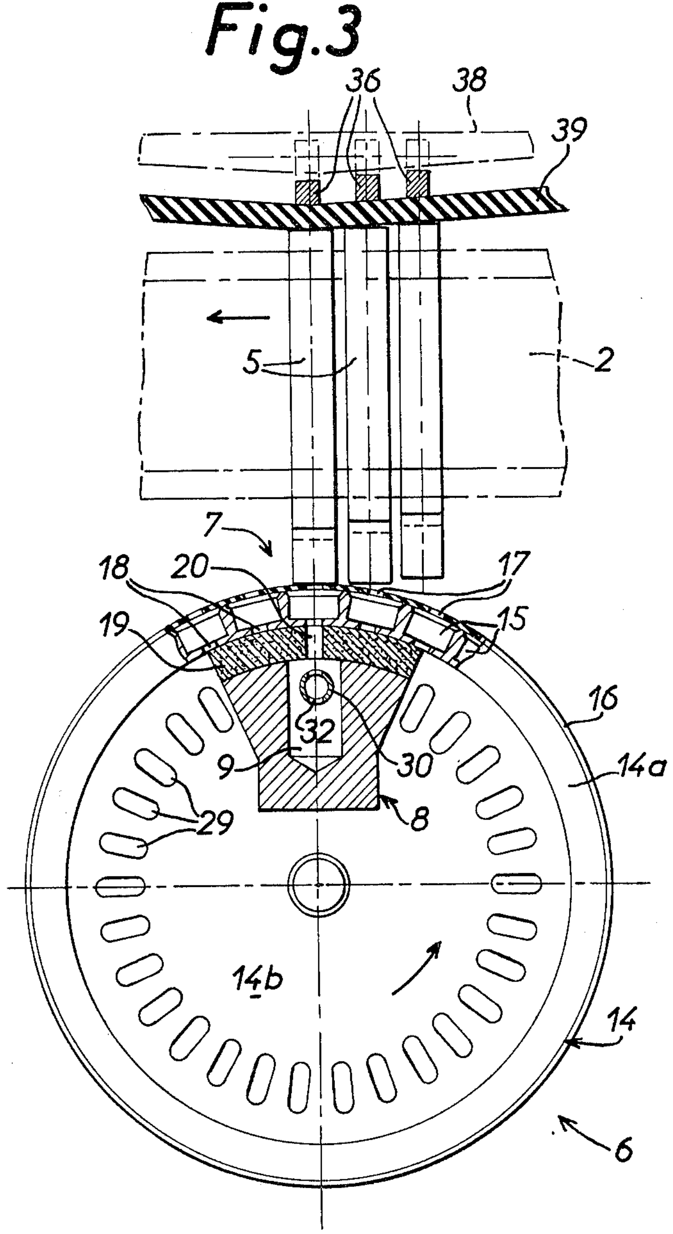
FIG. 3 is a section taken along the line III—III of FIG. 2.

As illustrated more in detail in FIGS. 2 and 3, said checking device 6 comprises in a manner known per se a fixed measuring head 8 incorporating a fixed chamber 9 having a volume of a few cubic centimeters, in which a transducer 10 is mounted. Said chamber 9 is adapted to be connected sequentially to each cigarette 5 caused to register separately with said check point 7, by a rotary distributor 11. According to a specific feature of the present invention, at time intervals differing from those during which said chamber 9 is connected to the cigarettes 5, said chamber 9 can communicate sequentially with a source of compressed gas 12 (shown only in FIG. 1), for instance a source of compressed air adapted to fill the chamber 9 with air under a predetermined pressure, for example of the order of 150 gr/sq.cm, through another distributor 13.

As illustrated in FIGS. 2 and 3, said distributors 11 and 13 utilize the same rotary drum 14 having its axis at right angles to the axis of rotation of the cylindrical conveyor 2. Said drum 14 is rotatably driven from power means (not shown) at a speed such that its peripheral velocity be equal to the travelling speed of the cigarettes 5 on said conveyor 2. The drum 14 comprises a flat disc 14*b* perpendicular to the drum axis and a cylindrical rim 14*a* at the outer periphery of said disc 14*b*. The distributor 11 comprises a plurality of cylindrical cavities or recesses 15 formed in said cylindrical rim 14*a* of drum 14, said cavities or recesses 15 being disposed circularly at regularly spaced angular intervals along said cylindrical rim with the same spacing or pitch as that of the cigarettes 5 on conveyor 2. On their outer side, said cavities 15 are closed by a belt 16 of flexible material, for instance rubber, covering the outer periphery of drum 14 and formed with holes 17 of, say, 3 mm in diameter, registering with respective cavities 15. The inner side of each cavity 15 comprises a vertical slot 18 opening into said drum 14.

The fixed measuring head 8 is urged for sliding contact against the inner surface of the cylindrical rim 14*a* of drum 14 and engages said inner surface through a lining 19 for instance of graphite, in which a vertical slot 20 constituting the outlet orifice of chamber 9 is formed. The fixed measuring head 8 is disposed in such a manner that the slots 18 register in succession with the vertical slot 20 during the rotation of drum 14. The measuring head 8 or more particularly an element 30 thereof is also kept in sliding contact with the upper flat surface of disc 14*b*.

The distributor 13 comprises a fixed distribution ring 21, which is urged by a plurality of springs 22 (of which only one is shown in FIG. 2) for sliding contact with the lower flat surface of disc 14*b* of drum 14, and which engages said lower flat surface through an annular friction lining 23, for instance of graphite. In the upper surface of the fixed ring 21 and under lining 23 a circular groove 24 is formed. Said groove 24 is connected via a union 25 and a pipe line 26 (see FIGS. 1 and 2) to the source of compressed air. An orifice or slot 27 is also provided in said lining 23 so that it registers at least partially with the inlet orifice 28 of chamber 9.

In addition to the fixed distribution ring 21, said distributor 13 comprises a plurality of orifices or slots 29 formed in the disc 14*b* of drum 14, said orifices 29 being equal in number to the slots 18 and disposed circularly at regularly spaced angular intervals in said disc 14*b* with the same angular spacing as the slots 18. As illustrated in FIG. 3, the orifices 29 have an elongated cross section with the major dimensions thereof disposed in radial directions of said disc 14*b*. Furthermore, said orifices 29 are shifted angularly a half-pitch in relation to the slots 18.

A hollow element 30 formed with an inlet orifice 31 having an elongated cross-sectional shape corresponding to that of orifices 29 is rotatably mounted in the inlet orifice 28 of chamber 9. Thus, the orientation of said elongated inlet orifice 31 can be adjusted as necessary in relation to the orifices 29. The inner space of said hollow member 30 communicates with the inner space of chamber 9 via orifices 32.

In a manner known per se a device 33 for sequentially urging one of the ends of the ends of the cigarettes 5, for example their filter-tip end, against the flexible belt 16 when they move past the check point 7 and, simultaneously, for sealing their opposite end, is provided. Said device 33 may comprise for instance a disc 34 connected for rotation with the shaft 35 of conveyor 2 so as to rotate in synchronism therewith, and a plurality of radial arms 36 pivotally mounted on the disc 34 and disposed at regularly spaced angular intervals with the same pitch as the pitch of the cigarettes 5 carried by the conveyor 2. Each radial arm 36 is normally urged by a spring blade 37 to a retracted position (shown in phantom lines in FIG. 2) and can be urged to an operative position (shown in solid line in FIG. 2) by a fixed cam 38 facing the check point 7 so as to press the cigarettes 5 in succession against the flexible belt 16 each time a cigarette moves past the check point 7. An element 39 of resilient material, consisting for example of a pad secured to the free end of each arm 36, or of a resilient ring interconnecting the free ends of arms 36, is adapted to impart a slight clamping pressure to the cigarettes 5 without any risk of damaging them at said check point 7.

Figure 6:
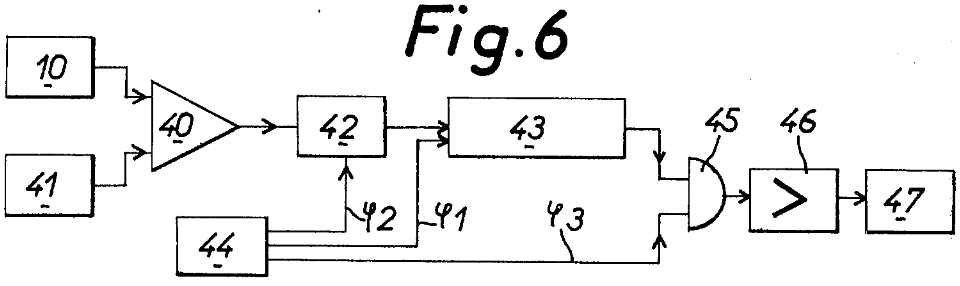
FIG. 6 is a block diagram of the logic circuits controlling the rejection of the defective cigarettes.

The transducer 10, comprising for example a piezoresistive pick-up, is adapted to deliver an electric signal the amplitude of which varies with the pressure in chamber 9. As illustrated in FIG. 6, said transducer 10 is connected to one input of a comparator 40 having its other input coupled to a reference signal generator 41 delivering for instance a constant voltage of preferably adjustable amplitude representative of the minimum pressure corresponding to a sound or acceptable cigarette. Said comparator 40 may be designed for making a direct comparison between the output signal of transducer 10 and the output signal of reference signal generator 41. Alternatively, the comparator 40 may be designed to substract firstly the output signal of reference signal generator 41 from the output signal of transducer 10, and then comparing the signal resulting from this subtraction with a reference voltage 0. In either case, the comparator 40 is capable of delivering an output signal corresponding to a defective cigarette whenever the pressure in chamber 9 normally filled with compressed air, under a pressure of, say, 150 gr/sq.cm., that is, higher than the aforesaid minimum pressure, drops below said minimum pressure. In the measuring time period corresponding to each cigarette the output signal of comparator 40 is stored in a memory 42 and transferred into the first stage of a shift register 43. A clock 44 delivers three clock pulse signals $\phi_1$, $\phi_2$ and $\phi_3$, consisting of pulses having the same frequency, which is equal to the rate of travel of the cigarettes past the check point 7. Each clock signal pulse $\phi_1$ causes the contents of the various stages of shift register 43 to step up one stage therein. Each clock signal pulse $\phi_2$ resets the memory 42 when the signal stored therein has been introduced into the first stage of shift register 43, in order to prepare the receipt of the next output signal from comparator 40 into said memory 42 within the measuring time period corresponding to the next cigarette. The output of register 43 is coupled to one of the two inputs of an AND gate 45 the other input of which receives the clock signal $\phi_3$ from clock 44, this signal $\phi_3$ acting as a synchronization signal for controlling the rejection of the defective cigarettes. The output of said AND gate 45 is coupled to a power amplifier 46 of which the output signal controls a device 47 for rejecting the defective cigarettes. Said device 47 may comprise for instance, in a manner known per se, a solenoid valve inserted in the compressed air supply circuit leading to a nozzle for blowing off the defective cigarettes, said nozzle being located for example on the path of the cigarettes transferred by conveyor 2, for example eight steps or pitches after check point 7 is the register 43 comprises eight stages.

Figure 4A:
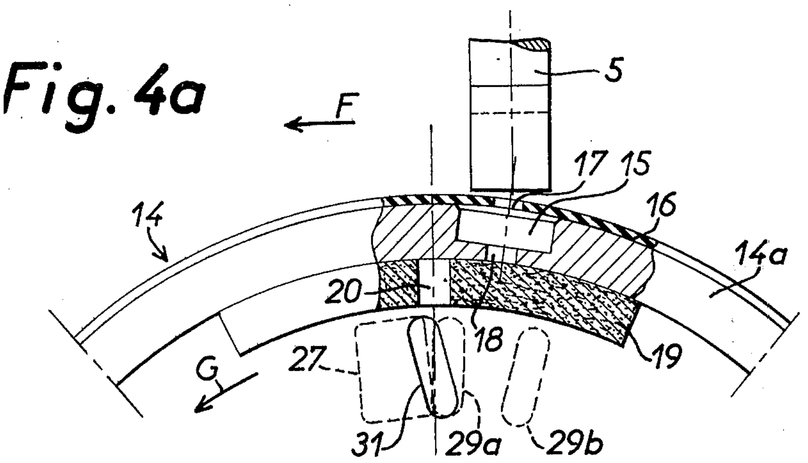
FIGS. 4*a* to 4*c* are fragmentary plane views from above showing on a still larger scale the relative positions assumed by the component elements of the checking device at three successive moments during the operation of the device.
Figure 4B:
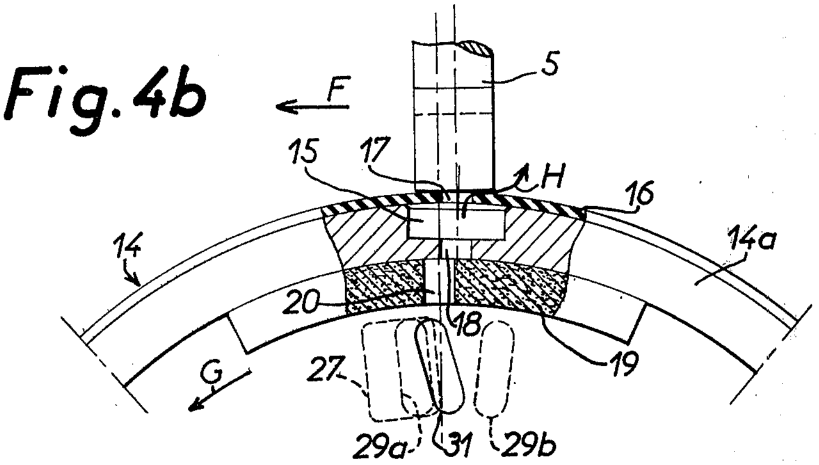
Figure 4C:
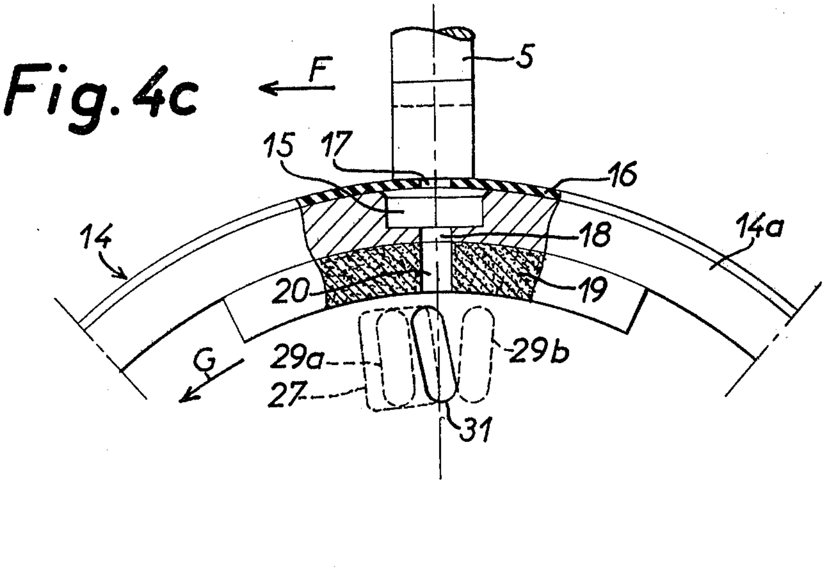

Now the mode of operation of the above-described cigarette checking device will be explained in detail. The cigarettes 5 are moved continuously across their longitudinal axes by the conveyor 2 and move successively past the check point 7. Therefore, the operation of the device will be discussed with reference to a specific cigarette, it being understood that the same operations will take place for each cigarette of the series. In FIGS. 4*a* to 4*c* the arrows F and G designate the direction of travel of cigarettes 5 and the direction of rotation of drum 14, respectively. In these three Figures, it will be seen that the slot 27 of distributor 13, the inlet orifice 31 of chamber 9 and the outlet slot 20 of the same chamber 9, are fixed in space. In FIG. 4*a*, one of the slots 29 of drum 14, that is, slot 29*a*, is shown at the time when air from the source of compressed air and distributor 13 begins to penetrate into chamber 9 of the measuring head, of which the outlet 20 is closed at that time since the slot 18 of drum 14 does not yet register with slot 20. The chamber 9 of said measuring head is thus filled with air under a predetermined pressure and the filling operation continues until after the slot 29*a* has passed over the position shown in FIG. 4*b*. At that time, the slot 29*a* does not interfere anymore with orifice 31 and the delivery of compressed air to the chamber 9 of said measuring head is cut off. At that time, slot 18 begins to register with slot 20, the cigarette 5 is brought into engagement with the flexible belt 16, and any compressed air contained in chamber 9 can flow through the cigarette 5. Then begins the cigarette checking operation proper. In FIG. 4*c* the slots 18 and 20 are aligned with each other and the cigarette is located at the centre of the checking area. This checking operation will be completed before the next adjacent slot 29*b* begins to interfere with slot 27.

Figure 5:
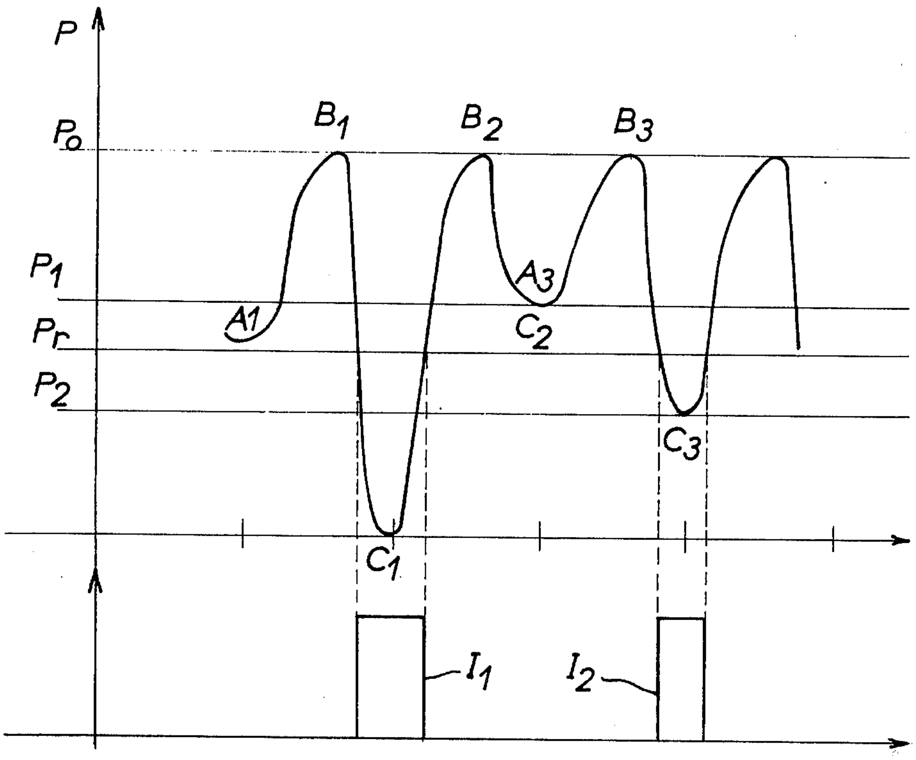
FIG. 5 is a diagram illustrating the variation in time of the pressure in the fixed measuring chamber of the cigarette checking device, and also the output signal of a comparator when said pressure drops below a predetermined value.

FIG. 5 illustrates a pressure versus time diagram showing a possible variation of the pressure in chamber 9 of the measuring head when checking successive cigarettes, the atmospheric pressure being considered to be zero. The portion $A_1$ $B_1$, $A_2$ $B_2$, $A_3$ $B_3$ of said diagram correspond to the filling of chamber 9. During this filling operation, the pressure rises up to a predetermined value $P_0$, for example 150 gr/sq.cm. The portions $B_1$ $C_1$, $B_2$ $C_2$ and $B_3$ $C_3$ of said diagram correspond to the cigarette checking phases. In portion $B_1$ $C_1$ of the diagram the pressure drops to zero, which corresponds to the absence of a cigarette on conveyor 2. The portion $B_2$ $C_2$ corresponds to the presence of a sound or acceptable cigarette, and the pressure drops to a value $P_1$. Portion $B_3$ $C_3$ corresponds to a defective cigarette, and the pressure drops to a value $P_2$ lower than $P_1$. Under these circumstances, it is only necessary to select a reference pressure $P_r$ within the range $P_1$ to $P_2$ as a minimum acceptable pressure, and all cigarettes displaying a pressure equal to or lower than $P_r$ will be considered as defective. Since transducer 10 delivers an output signal varying with the pressure P, any variations in time of the amplitude of this output signal may be represented by the same diagram as that shown in FIG. 5. It is only necessary to so adjust the constant voltage delivered by the reference generator 41 that it corresponds to the reference pressure $P_r$. Thus, each time a cigarette is found to be defective, or each time a cigarette is missing on conveyor 2, the comparator 40 delivers an output is missing on conveyor 2, the comparator 40 delivers an output signal in the form of, say, pulses $I_1$ and $I_2$ in FIG. 5, which pulses are subsequently utilized for controlling the rejection of defective cigarettes. Means (not shown) may be provided, if desired, for preventing the operation of the defective cigarette rejection control means in case the signal delivered by the comparator 40 corresponds to a missing cigarette.

It will be seen that, in the cigarette checking device described hereinabove, due to the cylindrical shape of the drum wall engaged by the cigarettes, the latter are in fluid-tight contact with this wall only when they are aligned with the outlet slot 20 of chamber 9. Consequently, as illustrated in FIG. 4*b*, when the slot 18 begins to register with slot 20, compressed air leaks may occur as shown by the arrow H. Therefore, to make up these leaks, which otherwise would affect the proper cigarette checking operation, the supply of compressed air to chamber 9 must continue for a short time. However, the communication between chamber 9 and the source of compressed air must be cut off by distributor 13 before the slots 18 and 2I be fully aligned with each other. This can be obtained by properly adjusting the orientation of orifice 31, i.e., by setting accordingly the angular position of hollow element 30.

Now a modified embodiment of the cigarette checking device of this invention will be described with reference to FIGS. 7 and 8 of the drawings. With this modified arrangement, the above mentioned adjustment is unnecessary and the supply of compressed air to chamber 9 may be cut off before said chamber communicates with the cigarette to be checked. In these Figures, the same reference numerals are used for designating similar or identical components or components having the same function as those of the preceding embodiment illustrated in FIGS. 1 to 4.

Figure 7:
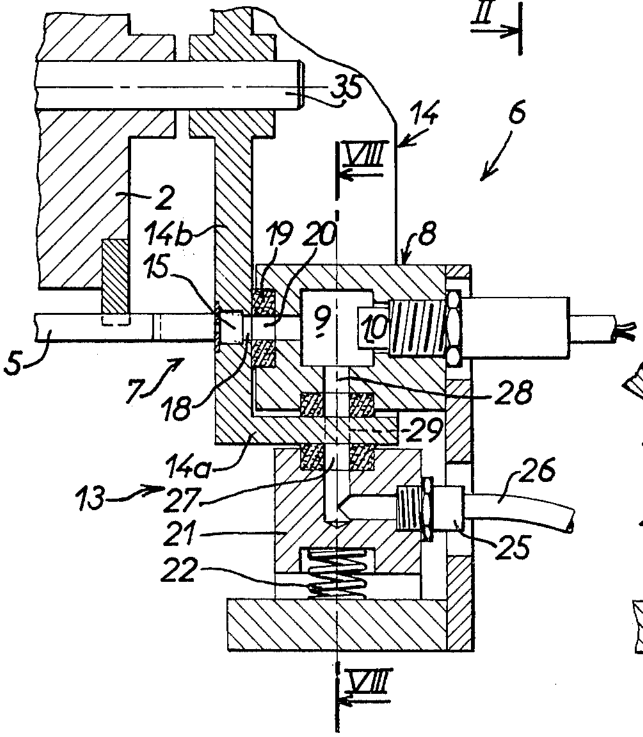
FIG. 7 is a section taken along the axis of the cylindrical conveyor and showing a modified embodiment of the checking device according to the present invention.
Figure 8:
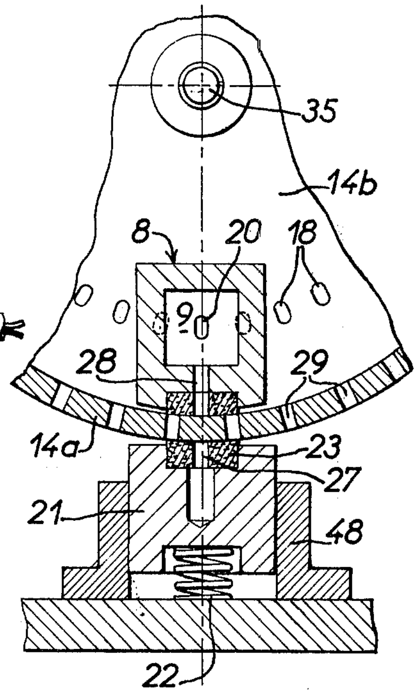
FIG. 8 is a section taken along the line VIII—VIII of FIG. 7.

The cigarette checking device illustrated only in fragmentary sectional views in FIGS. 7 and 8 departs essentially from the preceding structure in that the drum 14 is mounted rigidly on the shaft 35 of conveyor 2 for rotation in synchronism therewith. The cylindrical cavities 15 and 18 are formed in the disc 14*b* of drum 14, instead of in the outer cylindrical periphery 14*a* thereof. Conversely, the slots 29 are formed in the cylindrical rim 14*a* instead of in the disc 14*b*. The cigarettes 5 are urged by suitable and known means (not shown) against the outer flat face of disc 14*b*, said means being similar to the device 33 illustrated in FIG. 2. The fixed element 21 of distributor 13 has no longer an annular configuration but the shape of a block urged against the outer surface of the cylindrical rim 14*a* of drum 14*b* a single coil compression spring 22 and adapted to slide in a slideway 48.

The other component elements of the cigarette checking device of FIG. 7 and 8 are similar to those of the preceding embodiment, except for the hollow element 30 (FIGS. 2 and 3) which is omitted since no leak make-up action is required with this modified arrangement. The operation of the cigarette checking device of FIG. 7 and 8 is similar to that of the preceding embodiment and therefore its detailed description is not deemed necessary.

Of course, the various embodiments described hereinabove with reference to the accompanying drawings should not be construed as limiting the scope of the invention, since they are given by way of illlustration. Therefore, many modifications and changes may be brought thereto without departing from the basic principles of the invention as set forth in the appended claims.

What is claimed as new is:

1. In a method of checking finished cigarettes or other similar products, notably filter-tip cigarettes, in order to detect and reject defective cigarettes, comprising the steps of conveying continuously and transversally to their longitudinal axes a series of regularly spaced cigarettes, causing said cigarettes to move in succession past a checking station, feeding gas from a source of compressed gas successively into each cigarette moving past said checking station, said compressed gas being introduced into a chamber communicating with one end of the cigarette moving past said checking station while its other end is momentarily sealed, measuring the pressure of the gas thus fed to said cigarette, generating a signal representative of the measured pressure, comparing said signal with a predetermined threshold value representative of a minimum pressure corresponding to an acceptable cigarette, and generating a rejection signal when the instantaneous value of the measured pressure is lower than said minimum pressure, the improvement consisting in filling firstly said chamber with compressed gas so as to establish therein a pressure higher than said minimum pressure corresponding to an acceptable cigarette, cutting off the communication with said one end of the cigarette being checked, measuring a pressure drop resulting from the communication thus established between said chamber and the cigarette, and generating said rejection signal when the instantaneous value of the measured pressure drops below said minimum pressure.

2. Method as recited in claim 1, wherein said chamber is caused to begin to communicate with the cigarette end shortly before the communication between said chamber and said source of compressed gas is cut off completely.

3. Method as recited in claim 1, wherein said chamber is caused to communicate with the cigarette end only after the communication between said chamber and said source of compressed gas has been cut off completely.

4. In a device for checking cigarettes or other similar products, notably filter-tip cigarettes, in order to detect and reject defective cigarettes, comprising a conveyor for transferring continuously and transversally to their longitudinal axes a series of regularly spaced cigarettes along a predetermined path, and a checking station disposed adjacent the path of said cigarettes and comprising a fixed measuring head incorporating a fixed chamber having an inlet and an outlet, and a transducer in said fixed chamber a source of compressed gas connected to said fixed chamber inlet, a compressed-gas distributor for sequentially connecting said fixed chamber outlet to one end of a cigarette moving past said checking station, means for sealing the opposite end of said cigarette at said checking station, a reference signal generator, and a comparator having inputs electrically connected to said generator and said transducer, respectively, the improvement consisting in that a second compressed-gas distributor is disposed between said source of compressed gas and the inlet of said fixed chamber, and arranged for sequentially supplying compressed gas to said fixed chamber at time intervals differing from the time periods during which said fixed chamber outlet is connected to said one end of the cigarette moving past said checking station.

5. Device as recited in claim 4, wherein said first distributor comprises a member rotating in synchronism with said conveyor and having a wall adjacent to said one end of the conveyed cigarettes and formed with a first plurality of orifices disposed circularly and regularly spaced with a spacing equal to the spacing of the conveyed cigarettes, said sealing means being further adapted to push the cigarette moving past said checking station so as to urge said one end of said cigarette against a respective orifice of said first plurality on one side of said wall of said rotary member, said fixed measuring head being in sliding contact with the opposite side of said wall, and wherein said second compressed-gas distributor comprises a fixed member having a compressed-gas inlet connected to said compressed-gas source, and a compressed gas outlet at least partially facing and spaced from said fixed chamber inlet, and a second plurality of orifices equal in number to those of said first plurality, the orifices of said second plurality being disposed circularly and regularly spaced with the same angular spacing as said orifices of the first plurality, said orifices of said second plurality being formed in a wall of said rotary member, which is disposed between the outlet of said fixed member of said second distributor and the inlet of said fixed chamber in sliding contact with said fixed member and said fixed measuring head, said second plurality of orifices being shifted angularly one half-pitch in relation to the orifices of the first plurality.

6. Device as recited in claim 5, wherein said rotary member consists of a drum comprising a flat disc portion perpendicular to the drum axis, and a cylindrical peripheral portion.

7. Device as recited in claim 6, wherein said conveyor is a rotary cylindrical conveyor, said drum being so disposed that its axis extends at right angles to that of said cylindrical conveyor, the orifices of the first plurality being formed in the cylindrical portion of said drum, and the second plurality of orifices in said drum disc portion.

8. Device as recited in claim 6, wherein the outlet of the fixed member of said second compressed-gas distributor and the inlet of said fixed chamber are shifted angularly but overlap each other, the orifices of said second plurality have an elongated shape, respectively, in a radial direction of said drum disc portion, and a hollow member having an inlet orifice of elongated shape corresponding to the shape of the orifices of said second plurality is rotatably mounted in the inlet of said fixed chamber to permit an adjustment of the orientation of the elongated inlet orifice of said hollow member in relation to that of the orifices of said second plurality.

9. Device as recited in claim 6, wherein said conveyor is a cylindrical conveyor, said drum being disposed coaxially to said cylindrical conveyor and adapted to rotate in synchronism therewith, said first plurality of orifices being formed in the disc portion of the drum, while the orifices of the second plurality are formed in the cylindrical peripheral portion of said drum.

* * * * *